3,159,609
COPOLYMERS OF PERFLUOROVINYL ETHERS
John Ferguson Harris, Jr., Wilmington, and Donald Irwin McCane, Claymont, Del., assignors to E. I. du Pont de Nemours and Company, Wilmington, Del., a corporation of Delaware
No Drawing. Filed Oct. 26, 1956, Ser. No. 618,435
3 Claims. (Cl. 260—87.5)

The present invention relates to novel fluorinated polymeric materials, and more particularly to polymers of alkyl perfluorinated vinyl ethers.

Polymeric materials derived from fluorinated monomers such as tetrafluoroethylene have become well known for their outstanding physical properties such as toughness, corrosion resistance and thermal stability. Polytetrafluoroethylene having these outstanding properties has, however, an extremely high melt viscosity due to its high molecular weight, which makes melt fabrication of the polymer very difficult. It has heretofore been found that the melt flow of tetrafluoroethylene polymers could be increased by copolymerization with ethylenically unsaturated monomers. However, many of the copolymers are either difficult to prepare or have properties which do not come close to the outstanding properties of polytetrafluoroethylene. The polymers and copolymers of the present invention were developed in the search for plastics which combine the outstanding physical properties of polytetrafluoroethylene with high enough melt flow to allow their fabrication by melt extrusion or injection molding.

In accordance with the present invention, high molecular weight polymers are obtained by the polymerization of alkyl perfluorovinyl ethers having the general formula:

$$CF_2=CF-OR$$

wherein R is a member of the class consisting of alkyl and fluorinated alkyl radicals. The alkyl perfluorovinyl ethers may further be copolymerized with halogenated ethylenes, and particularly with tetrafluoroethylene to give rise to high molecular weight solid copolymers.

The alkyl perfluorovinyl ethers employed in the present invention are preferably those having from 1 to 5 carbon atoms in the alkoxy radical. Examples of the alkyl- and fluoroalkyl perfluorovinyl ethers are methyl perfluorovinyl ether, n-butyl perfluorovinyl ether, trifluoromethyl perfluorovinyl ether, and 2,2,2-trifluoroethyl perfluorovinyl ether. The alkyl perfluorovinyl ethers are prepared by the reaction of the alkali metal alcoholate of the alcohol corresponding to the alkoxy group in the ether with tetrafluoroethylene. The reaction may be illustrated by the following equation:

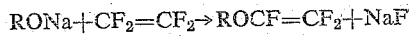

It is not necessary that the alkali metal alcoholate is isolated, but the reaction may be carried out by reacting the alcohol with a sodium dispersion in an organic solvent and then adding tetrafluoroethylene to the resulting reaction mixture. However, great care should be taken that no hydroxyl hydrogen or other available hydrogen remains in the reaction system when the tetrafluoroethylene is added; otherwise, the saturated ether,

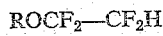

is formed.

The fluorinated alkyl ethers may be prepared by the reaction of fluorinated alcoholates with tetrafluoroethylene or by the fluorination of 2-alkoxy propionic acids followed by the decarboxylation and defluorination of the sodium salt of the perfluorinated 2-alkoxy propionic acid which leads to the formation of the perfluorinated alkyl vinyl ether.

The preparation of the alkyl perfluorovinyl ethers is illustrated by the following experimental procedure.

Into a glass vessel was charged 18.5 g. of n-butyl alcohol dissolved in 150 ml. of sodium dried dioxane. An excess of the theoretical amount of sodium in the form of a 50% dispersion in toluene was added with stirring under nitrogen over a period of 4 hours. The mixture was allowed to stir for an additional 12 hours and then was charged into a 320 ml. stainless steel bomb. The bomb was sealed, pressured to 300 p.s.i. with tetrafluoroethylene, and heated to 85 to 90° C. under agitation. The bomb was repressured with tetrafluoroethylene as was necessary to maintain the pressure. The reaction was continued for approximately 2 hours, until no further decrease in pressure occurred. On removal from the cooled reaction vessel, the reaction mixture was treated with n-butyl alcohol to destroy any excess sodium present. The reaction mixture was filtered and the filtrate was distilled. There was obtained 10.1 g. of pure n-butyl perfluorovinyl ether.

The alkyl perfluorovinyl ethers are highly reactive monomers which are polymerized by minor quantities of oxygen at elevated temperatures. Preferably, however, free radical catalysts such as are produced from peroxides and azo compounds are employed to initiate the polymerization. Pressure and temperature may be varied over a wide range. However, temperatures in the range of 0 to 100° C. are preferred, since the polymer formed in that range is a tough, high molecular weight solid. The polymerization may be carried out in bulk or in the presence of an inert diluent such as water or a perfluorinated solvent. The copolymerization of the alkyl perfluorovinyl ethers with tetrafluoroethylene is preferably carried out in an aqueous phase employing polymerization procedures developed for the homopolymerization of tetrafluoroethylene, which are known in the art and need no further elaboration.

The preparation of the alkyl perfluorovinyl ether polymers is further illustrated by the following examples.

*Example I*

Into a glass vessel was placed 18 g. of methyl perfluorovinyl ether and 0.1 g. alpha,alpha'-azo-bis-(alpha,omega-dimethylvaleronitrile). The glass vessel was maintained for 3½ days at a temperature of 8 to 10° C. The reaction mixture was then filtered and the filtrate washed and dried. A polymeric material weighing 10 g. was obtained. The polymer could be molded at 240° C. into tough, clear films which could be cold drawn. The inherent viscosity of the polymer in dimethyl foramide at 35° C. was 1.33.

*Example II*

Into a 320 ml. platinum lined presure vessel was charged 200 ml. of oxygen free water, 0.5 g. of ammonium perfluorocaprylate, 0.1 g. of ammonium persulfate and 2.0 g. of n-butyl perfluorovinyl ether. The reaction vessel was pressured to 450 p.s.i. with tetrafluoroethylene and agitated for two hours at 85 to 88° C. The reaction vessel was then cooled and excess monomer was removed. The reaction mixture was filtered, the filtrate was washed with water and dried in a vacuum oven. A solid polymeric product weighing 15.7 g. was obtained. The polymer was found to have a melt viscosity of $1 \times 10^3$ poises at 380° C. Infrared analysis of a film of the polymer showed the polymer to be a copolymer of tetrafluoroethylene and n-butyl perfluorovinyl ether.

*Example III*

Into a 320 ml. platinum lined pressure vessel was charged 200 ml. of oxygen free water, 0.5 g. of ammonium perfluorocaprylate, 0.1 g. of ammonium persulfate and 2.1 g. of n-propyl perfluorovinyl ether. The vessel was then pressured with tetrafluoroethylene until a pressure of 450 p.s.i. was obtained and heated to 85–88° C. The vessel was agitated for 2 hours at that temperature. The pressure dropped 100 p.s.i. in that interval. The reaction vessel was cooled and excess monomer was removed. The reaction mixture was filtered, and the filtrate was washed with water and dried in a vacuum oven. A white solid polymeric product weighing 26.4 g. was obtained. The polymer was found to have a melt viscosity of $2 \times 10^3$ poises at 380° C. Infrared analysis of the polymer showed the material to be a copolymer of tetrafluoroethylene and n-propyl perfluorovinyl ether.

*Example IV*

Into a 320 ml. platinum lined pressure vessel was charged 200 ml. of oxygen free water, 0.01 g. of ammonium persulfate, 0.5 g. of ammonium perfluorocaprylate and 20 g. of methyl perfluorovinyl ether. The vessel was pressured to 400 p.s.i. with tetrafluoroethylene and heated to 80° C. The reaction mixture was agitated for two hours at that temperature and repressured as was necessary to maintain a pressure of at least 400 p.s.i. The reaction vessel was then cooled and excess monomer was removed. The reaction mixture was washed with water, filtered and the filtrate dried in a vacuum oven. A white rubbery polymer weighing 17 g. was obtained. The polymer was identified by infrared analysis as a copolymer of tetrafluoroethylene and methyl perfluorovinyl ether. The polymer was found to soften at a temperature of 80 to 100° C. and could be molded into fairly tough films at 100° C. The polymer was found to have an inherent viscosity of 0.11 in dimethyl formamide at 35° C.

*Example V*

Into a glass vessel was placed 4.7 g. of 2,2,2-trifluoroethyl perfluorovinyl ether and 0.01 g. of alpha,alpha'-azobis-(alpha,omega-dimethylvaleronitrile). The glass vessel was maintained for approximately 12 hours at a temperature of 60 to 80° C. There was obtained 0.3 g. of a solid polymeric material having a melting point at 60 to 80° C. and inherent viscosity of 0.15 in dimethyl formamide at 35° C.

*Example VI*

Into a glass vessel was placed 1.3 g. of 2,2,2-trifluoroethyl perfluorovinyl ether containing 1% of benzoyl peroxide. The vessel was sealed and maintained for three hours at a temperature of 85° C. The monomer was quantitatively converted into a hard colorless polymer having an inherent viscosity of 0.26. The polymer was unaffected by refluxing concentrated nitric acid, refluxing 20% aqueous sodium hydroxide, or concentrated sulfuric acid at 80° C.

*Example VII*

Employing the procedure of Example VI, 1.3 g. of 2,2,3,3-tetrafluoropropyl perfluorovinyl ether was quantitatively converted to a hard clear polymer. The polymer was unaffected by refluxing concentrated nitric acid, refluxing 20% aqueous sodium hydroxide, or concentrated sulfuric acid at room temperature.

The examples have illustrated the preparation of polymers which have a fluorinated polymer chain structure with pendent alkoxy groups, and are characterized by the following formula:

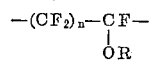

where R is an alkyl or fluorinated alkyl group and $n$ is one or a number greater than one. The number of difluoromethylene radicals between the fluoroalkoxy radicals is one in the case of the homopolymer and will become increasingly greater than one as the alkyl perfluorovinyl ether is copolymerized with increasing amounts of tetrafluoroethylene. Although the examples have illustrated the preparation of only some of the polymers of the present invention, it is to be understood that alkyl perfluorovinyl ethers in which the alkyl group has a larger number of carbon atoms may be employed to form the polymers of the present invention.

Low molecular weight polymers of the alkyl perfluorovinyl ethers may also be prepared by heating the ether in the absence of a polymerization initiator in a bomb to temperatures of 80 to 120° C. The resulting products are dimers, trimers, and tetramers of alkyl perfluorovinyl ethers. Of particular interest, because of their thermal stability, are the dimers of the alkyl perfluorovinyl ethers, which are saturated four carbon fluorinated ring compounds with two pendent alkoxy groups. These cyclic alkyl perfluorovinyl ether dimers are useful as lubricating oils.

The properties of the polymers and copolymers of the present invention will, of course, vary with the type of alkyl perfluorovinyl ether employed and with the amount of tetrafluoroethylene copolymerized with the alkyl perfluorovinyl ether. The polymers of the present invention are high molecular weight solids which have increasing elastomeric characteristics as the amount of the pendent alkoxy radical in the polymer chain is increased and as the chain length of the alkoxy radical is increased. These polyvinyl ethers in contrast to polytetrafluoroethylene have sufficient melt flow to make their fabrication by conventional techniques such as injection molding and melt extrusion possible.

The high molecular weight solid polymers and copolymers of the present invention are useful for a wide range of applications. The polymeric alkyl perfluorovinyl ethers can be compression molded and injection molded into massive articles or melt extruded into tubing, film, and fibers. The copolymers are further suitable for wire coating to provide electrical insulation and for other types of coatings. The poly-alkyl perfluorovinyl ethers can be admixed with stabilizers, fillers, or pigments to improve certain characteristics of the polymer.

We claim:

1. A normally solid copolymer of terafluoroethylene and an alkyl perfluorovinyl ether having the general formula $$CF_2 = CFOR$$

wherein R is a member of the class consisting of alkyl radicals having from 1 to 5 carbon atoms, said copolymer having an inherent viscosity, as measured in dimethyl formamide at 35° C., of at least 0.11.

2. A normally solid polymer as set forth in claim 1 wherein the alkyl perfluorovinyl ether is methyl perfluorovinyl ether.

3. A normally solid polymer as set forth in claim 1 wherein the alkyl perfluorovinyl ether is n-butyl perfluorovinyl ether.

References Cited in the file of this patent

UNITED STATES PATENTS

| | | |
|---|---|---|
| 2,475,423 | Dickey et al. | July 5, 1949 |
| 2,559,752 | Berry | July 10, 1951 |
| 2,737,530 | Ruh | Mar. 6, 1956 |
| 2,813,848 | Barr | Nov. 19, 1957 |
| 2,784,175 | Keel et al. | Mar. 5, 1957 |
| 2,799,712 | Croix et al. | July 16, 1957 |
| 2,917,548 | Dixon | Dec. 15, 1959 |
| 2,982,786 | McCane | May 2, 1961 |

OTHER REFERENCES

Schildknecht: Vinyl and Related Polymers, Wiley, New York, (1952), page 593.

Adams and Bovey: J. of Polymer Science, volume IX, pages 481–492 (1952).